United States Patent
Pei

(10) Patent No.: US 8,867,118 B2
(45) Date of Patent: Oct. 21, 2014

(54) LENS MODULE WITH INFRARED ABSORBING FILTER

(75) Inventor: Shao-Kai Pei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/420,556

(22) Filed: Mar. 14, 2012

(65) Prior Publication Data

US 2013/0120823 A1 May 16, 2013

(30) Foreign Application Priority Data

Nov. 16, 2011 (TW) .............................. 100141801 A

(51) Int. Cl.
G02F 1/153 (2006.01)
G02F 1/163 (2006.01)
G02F 1/157 (2006.01)

(52) U.S. Cl.
CPC ................. *G02F 1/153* (2013.01); *G02F 1/163* (2013.01); *G02F 1/157* (2013.01)
USPC .......................................... 359/267; 359/266

(58) Field of Classification Search
CPC .......... G02F 1/157; G02F 1/163; G02F 1/153
USPC ..................... 359/260–276; 362/494; 348/362
See application file for complete search history.

(56) References Cited

U.S. PATENT DOCUMENTS

| | | | | |
|---|---|---|---|---|
| 4,746,948 A | * | 5/1988 | Matsui | 396/129 |
| 5,471,339 A | * | 11/1995 | Ise et al. | 359/275 |
| 6,426,492 B1 | * | 7/2002 | Bos et al. | 250/208.1 |
| 6,870,656 B2 | * | 3/2005 | Tonar et al. | 359/265 |
| 6,906,842 B2 | * | 6/2005 | Agrawal et al. | 359/265 |
| 7,179,535 B2 | * | 2/2007 | Fisher | 428/437 |
| 8,270,059 B2 | * | 9/2012 | Friedman et al. | 359/273 |

\* cited by examiner

*Primary Examiner* — Ricky Mack
*Assistant Examiner* — Daniele Manikeu
(74) *Attorney, Agent, or Firm* — Novak Druce Connolly Bove + Quigg LLP

(57) ABSTRACT

A lens module includes an infrared absorbing filter. The infrared absorbing filter includes an electrochromic substrate. The electrochromic substrate changes from colorlessness to blue when a preset voltage is applied on the electrochromic substrate. The electrochromic substrate is configured for absorbing the infrared constituent of incoming light rays when the color is changed to blue.

1 Claim, 3 Drawing Sheets

LENS MODULE WITH INFRARED ABSORBING FILTER

BACKGROUND

1. Technical Field

The present disclosure relates to lens modules and, particularly, to a lens module with an infrared absorbing filter.

2. Description of Related Art

Lens modules may include at least one lens and a filter positioned at an image side of the lens. The filter may include a transparent substrate and an infrared filtering film coated on an object side of the transparent substrate. The filter is for reflecting infrared light rays while allowing the passage of visible light rays. However, a minority of visible light rays, round about 5% or more, are also reflected by the infrared filtering film. The reflected visible light rays form a glare in an image after multiple reflections in the lens module.

Therefore, it is desirable to provide a lens module, which can overcome the limitations described.

DETAILED DESCRIPTION

Embodiments of the disclosure will be described with reference to the drawings.

Figure 1:
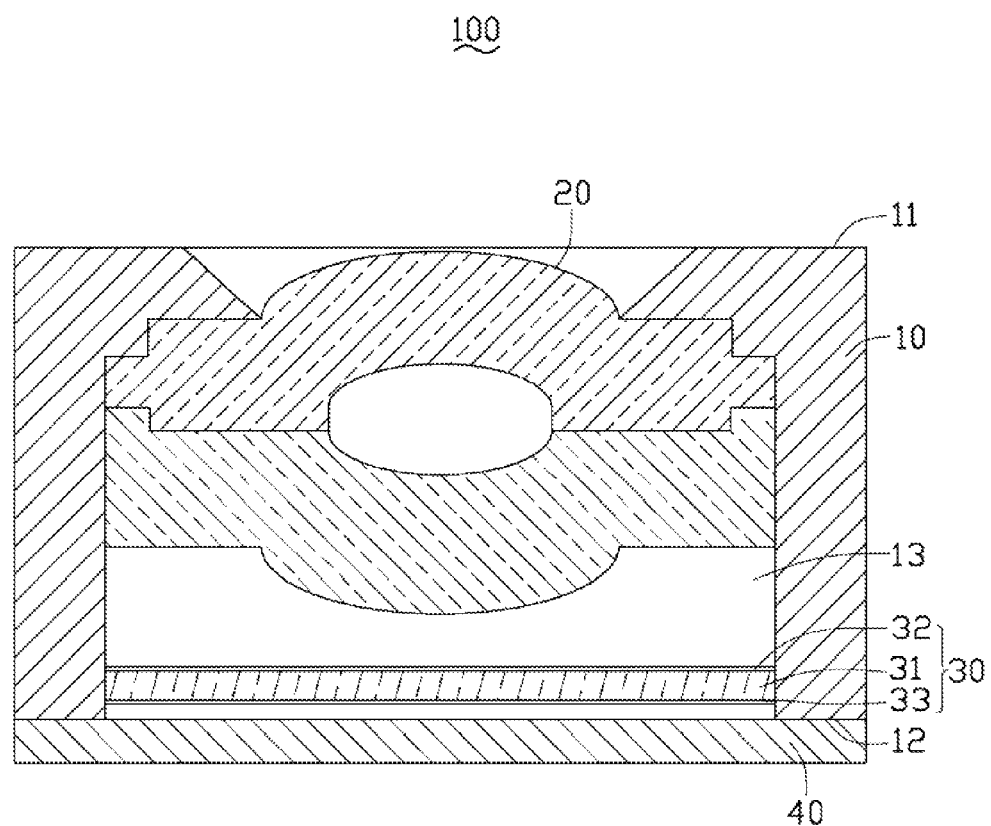
FIG. 1 is a cross-sectional schematic view of a lens module of an exemplary embodiment.

FIG. 1, shows a lens module 100, according to an exemplary embodiment. The lens module 100 includes a lens barrel 10, at least one lens 20, an infrared absorbing filter 30, and an image sensor 40.

The lens barrel 10 is tubular and includes an object-side end 11 and an image-side end 12 opposite to the object-side end 11. The lens barrel 10 defines a substantially tubular receiving room 13 extending through the object-side end 11 and the image-side end 12. In this embodiment, the lens barrel 10 is made of light-shielding/opaque/black material(s).

The at least one lens 20 is received in the receiving room 13, adjacent to the object-side end 11. Each of the at least one lens 20 is made of plastic, glass, or other transparent materials, and is spherical or aspherical. In this embodiment, the lens module 100 includes two lenses 20 arranged in the receiving room 13.

The infrared absorbing filter 30 is received in the receiving room 13, between the at least one lens 20 and the image side end 12. The infrared absorbing filter 30 is configured for absorbing infrared light rays penetrating through the at least one lens 20. The infrared absorbing filter 30 includes an electrochromic substrate 31, an anti-reflection film 32, and an infrared filtering film 33.

Figure 2:
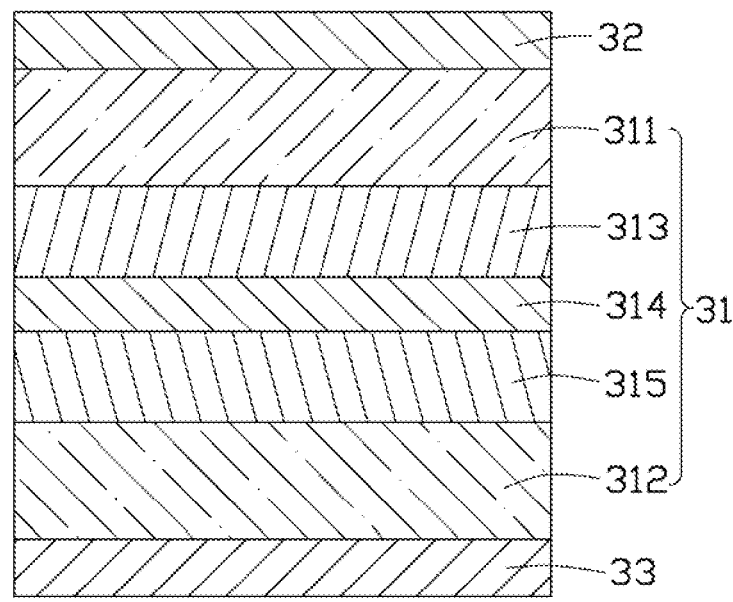
FIG. 2 is a cross-sectional schematic view of an infrared absorbing filter of the lens module of FIG. 1.

In FIG. 2, the electrochromic substrate 31 includes a first transparent conductive glass 311, a second transparent conductive glass 312, a metal ion film 313, an electrolytic film 314, and a metal oxide film 315. The metal ion film 313, the electrolytic film 314, and the metal oxide film 315 are positioned in that order between the first transparent conductive glass 311 and the second transparent conductive glass 312. The first transparent conductive glass 311 faces the object side end 11, and the second transparent conductive glass 312 faces the image side end 12. A positive terminal and a negative terminal of a power source (not shown) are respectively connected to the first transparent conductive glass 311 and the second transparent conductive glass 312. The metal ion film 313 is a lithium (Li) film, and configured for providing $Li^+$. The metal oxide film 315 is a $WO_3$ film. When the $Li^+$ is injected into the $WO_3$ film, the color of the electrochromic substrate 31 changes to blue. In other embodiments, the metal ion can be $Na^+$ or $Ag^+$, and the metal oxide can be $TiO_2$ or $Nb_2O_5$.

The anti-reflection film 32 is coated on the first transparent conductive glass 311. The infrared filtering film 33 is coated on the second transparent conductive glass 312. The anti-reflection film 32 includes first to fourth layers stacked in a particular order on the first transparent conductive glass 311. The odd numbered layers (1 and 3) of the anti-reflection film 32 are made from titanium dioxide ($TiO_2$) and the even numbered layers (2 and 4) of the anti-reflection film 32 are made from silicon dioxide ($SiO_2$). The infrared filtering film 33 includes first to fifty fourth layers stacked in a particular order on the second transparent conductive glass 312. The odd numbered layers of the infrared filtering film 33 are made from $TiO_2$, and the even numbered layers of the infrared filtering film 33 are made from $SiO_2$. The thickness of each layer is designed according to the optical characteristics required for the anti-reflection film 32 and the infrared filtering film 33.

The anti-reflection film 32 can have any number of layers with other materials for the non-reflection of light rays. The infrared filtering film 33 can have any number of layers with other materials for filtering infrared light rays.

The image sensor 40 is positioned at the image-side end 12 and covers the receiving room 13. The light rays penetrating the at least one lens 20 and the infrared absorbing filter 30 are projected on an imaging surface of the image sensor 40 which converts the light rays to electrical signals.

Before each use of the lens module 100, a preset voltage, such as 1.2V, is applied on the electrochromic substrate 31. An electric field is formed between the first transparent conductive glass 311 and the second transparent conductive glass 312, the $Li^+$ of the metal ion film 313 is transmitted to the $WO_3$ film of the metal oxide film 315 through the electrolytic film 314 under the influence of the electric field. When the $Li^+$ of the metal ion film 313 is injected into the $WO_3$ film of the metal oxide film 315, the color of the metal oxide film 315 changes to blue. The color of the whole electrochromic substrate 31 changes to blue. When the voltage applied on the electrochromic substrate 31 is removed, the electrochromic substrate 31 retains blue color for about 600 second(s).

Light rays enter into the lens module 100 from the object-side end 11 of the lens barrel 10 and strike the infrared absorbing filter 30. The light rays penetrate the anti-reflection film 32, then the electrochromic substrate 31, and then the infrared filtering film 33. The infrared constituent of the light rays penetrating the anti-reflection film 32 are absorbed by the blue electrochromic substrate 31, and the light rays with wavelength from about 420 nm to about 680 nm penetrate through the electrochromic substrate 31.

The value of the voltage applied on the electrochromic substrate 31 is gradually increased from 0 to the preset voltage, and the color of the electrochromic substrate 31 gradually changes from colorlessness to blue. If the value of the preset voltage is increased, the blue color of the electrochromic substrate 31 darkens. During each use of the lens module 100, the voltage applied on the electrochromic substrate 31 can be reset according to the absorbency of different colors which is required.

The anti-reflection film 32 provides an enhanced transmissivity for light rays, and thus less than about 3% are reflected by the anti-reflection film. As the infrared filtering film 33 can further filter the infrared constituent of light rays, less infrared light will be projected on the image sensor 40. Therefore, any glare in an image will be reduced, and the quality of the image is enhanced.

Figure 3:
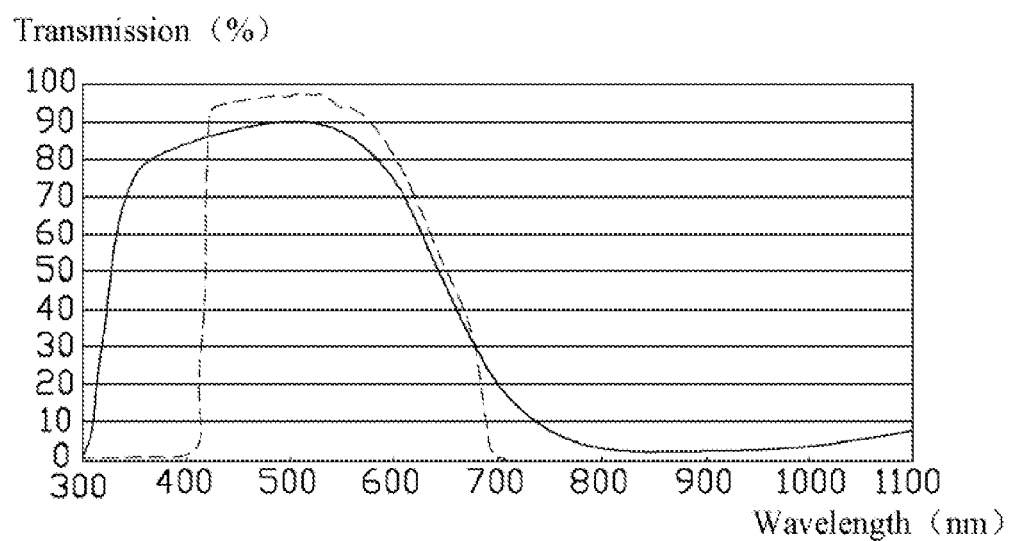
FIG. 3 is a spectrum chart of the infrared absorbing filter of the lens module of FIG. 1.

In FIG. 3, the solid line represents a spectrum chart of light rays penetrating through the electrochromic substrate 31. The dashed line represents a spectrum chart of light rays penetrating through the infrared absorbing filter 30. Both the electrochromic substrate 31 and the infrared absorbing filter 30 can filter out infrared light and allow passage of visual light rays, the effectiveness of the infrared absorbing filter 30 is greater than that of the electrochromic substrate 31.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module, comprising:

at least one lens;

an image sensor; and an infrared absorbing filter positioned between the at least one lens and the image sensor, the infrared absorbing filter comprising:

an electrochromic substrate;

an anti-reflection film coated on an object-side surface of the electrochromic substrate; and an infrared filtering film coated on an image-side surface of the electrochromic substrate and opposite to the anti-reflection film;

wherein the electrochromic substrate comprises a first transparent conductive glass, a second transparent conductive glass, a metal ion film, an electrolytic film, and a metal oxide film; the metal ion film, the electrolytic film, and the metal oxide film are orderly positioned between the first transparent conductive glass and the second transparent conductive glass;

wherein a color of the electrochromic substrate is changed to blue when a preset voltage is applied on the electrochromic substrate, the electrochromic substrate is configured for absorbing infrared light rays of light rays projected on the lens module when the color is changed to blue;

wherein the anti-reflection film comprises first to fourth layers stacked in a particular order on the first transparent conductive glass, the odd numbered layers of the anti-reflection film are made from titanium dioxide ($TiO_2$) and the even numbered layers of the anti-reflection film are made from silicon dioxide ($SiO_2$).

* * * * *